United States Patent [19]

Winston

[11] Patent Number: 4,483,007
[45] Date of Patent: Nov. 13, 1984

[54] ENERGY TRANSMISSION WITH RESPECT TO CONVEX SOURCES AND RECEIVERS

[75] Inventor: Roland Winston, Chicago, Ill.

[73] Assignee: The University of Chicago, Chicago, Ill.

[21] Appl. No.: 282,232

[22] Filed: Jul. 10, 1981

Related U.S. Application Data

[63] Continuation of Ser. No. 69,326, Aug. 24, 1979.

[51] Int. Cl.³ .............................................. H01S 3/093
[52] U.S. Cl. ...................................... 372/72; 372/99; 350/625
[58] Field of Search .............. 372/72, 69, 92; 328/99; 350/293, 294

[56] References Cited

U.S. PATENT DOCUMENTS

| 3,064,781 | 1/1965 | Goldberg | 372/38 |
| 3,238,470 | 3/1966 | Mooney | 372/72 |
| 3,634,777 | 1/1972 | Uchida | 372/72 |
| 3,893,754 | 7/1975 | McInally | 350/294 |

Primary Examiner—William L. Sikes
Assistant Examiner—Léon Scott, Jr.
Attorney, Agent, or Firm—Marshall, O'Toole, Gerstein, Murray & Bicknell

[57] ABSTRACT

Devices for transmission of radiant energy from a convex source to a convex receiver wherein a concave wall reflects rays of selected angularity of source onto the receiver at a selected angularity and in a single reflection. Preferred devices permit transmission of extreme energy rays from a tubular source to a tubular receiver with one or less reflection.

7 Claims, 8 Drawing Figures

ENERGY TRANSMISSION WITH RESPECT TO CONVEX SOURCES AND RECEIVERS

This is a continuation of application Ser. No. 69,326, filed Aug. 24, 1979.

BACKGROUND

The present invention relates generally to radiant energy transmission and more particularly to improved devices for the efficient transmission of energy emanating from a geometrically convex source to a geometrically convex receiver.

Applicant's publication appearing in *Solar Energy* Vol. 16, No. 2, pages 89–95 (1974), as well as his U.S. Pat. Nos. 3,957,031, 4,002,499, 4,114,592 and 4,130,107 describe techniques for generating the ideal reflective wall contour for certain energy transmission (i.e., collection and emission) devices. Applicant's U.S. Pat. No. 4,240,692, issued Dec. 23, 1980, is addressed to shaping of such ideally reflecting walls in a manner consistent with assuring total internal reflectivity for the devices. Such concentrator devices are generally characterized by a suitable reflective wall contour (parabolic, elliptical, etc.) permitting extreme incident rays from an energy source to be transformed, after at most one reflection, into the extreme rays incident on an energy absorbing body. In each case the reflective wall contour is shaped to assume the maximum possible slope consistent with reflecting the extreme rays onto the absorber, subject to accommodation for such subsidiary conditions as specification of a selected maximum angle of incidence along the absorber or a requirement that reflection along a portion of the wall be accomplished by total internal reflectivity. In all such cases, however, the extreme incidence rays treated were those emanating either from a "point" source located at infinity or a source which is flat and located at a finite distance from the concentrator.

There exists a long standing need in the art of energy transmission for devices capable of high efficiency in transmitting radiant energy from a convex source to a convex receiver located at a finite distance from the source. Examples of such devices include lamps intended to uniformly illuminate a convex surface with direct and reflected energy from, e.g., a fluorescent light tube. The need to assure efficient, uniform energy transmission is particularly acute in the design of cavity pump systems for the transformation of the power spectrum of a flash tube to that within the space occupied by a rod of lasing material. A wide variety of designs for mirror cavity systems have been proposed in the laser art (see, e.g., Mahlein, et al., *Laser Devices and Techniques* pp. 508–517 in "Laser Handbook", Vol 1., North Holland Publishing, Amsterdam, Holland (1972) but none have consistently achieved the desired optimal levels of energy transfer efficiency.

BRIEF SUMMARY

The present invention provides novel devices for the transmission of radiant energy from a geometrically convex source to a geometrically convex receiver. More specifically, the devices of the invention provide an improvement in prior art systems wherein a wall surface adjacent the receiver and/or source is employed to reflect energy emanating from the source onto the receiver. The reflecting wall portion of devices of the invention is concave, non-elliptical, and so shaped and positioned with respect to receiver and source as to reflect source rays emanating from a first predetermined angle onto the receiver, at a second predetermined angle and in a single reflection. As such, the devices of the present invention—viewed in the context of concentrators—are capable of attaining the maximum permissible concentration allowed by the Second Law of Thermodynamics.

It is presently contemplated that the most significantly useful application for devices of this type is in the field of laser energy generation. In a most preferred embodiment of the invention, rays emanating tangentially from a tubular source (such as a flash tube) impinge upon the prescribed wall and are reflected tangentially onto a tubular receiver (such as a lasing rod) having its axis in parallel alignment with the source. Remarkably, the precise convex curving slope of the wall in such an embodiment may be defined in terms of an elegantly simple "string construction."

Devices of the invention may be provided with a reflective wall partially or wholly "enclosing" the space surrounding the source and receiver and may also include refractive lens elements. Further, the reflective wall portion may be provided in the form of a specular surface or as the optical boundary between media of differing refractive indices (with reflection resulting from total internal reflectivity).

Other aspects and advantages of the present invention will become apparent upon consideration of the following detailed description and the drawing wherein.

Figure 7:
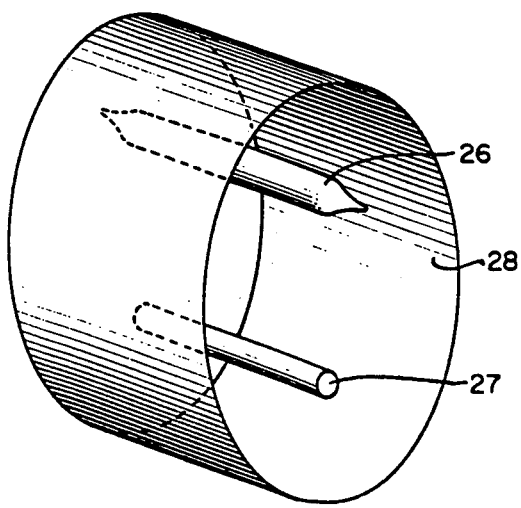
Figure 8:
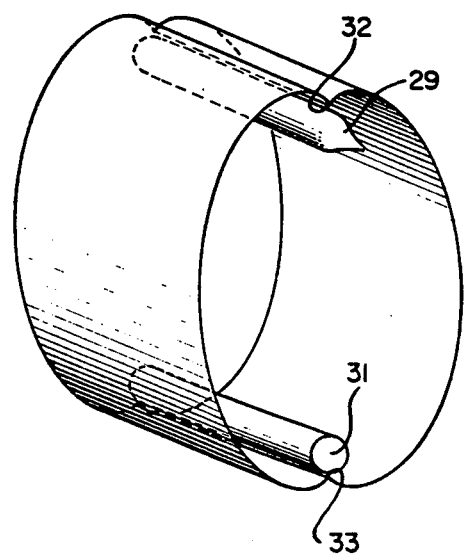

FIG. 7 schematically illustrates a prior art laser generating device; and,

FIG. 8 schematically illustrates a laser generating device according to the invention.

DETAILED DESCRIPTION

As employed herein, "convex" and "geometrically convex" shall be synonymous and designate any non-planar, non-concave shape for operatively opposed surfaces of energy sources and receivers. Cross-sectional shapes thus comprehended by the terms include circles, ellipses and the like and segments of such shapes (e.g., arcs of circles and parabolas) as well as irregular shapes which are predominantly convex. By way of illustration, the present invention provides for efficient transmission from a tubular energy source (which reveals a circular cross-section) to a tubular receiver or trap having the same or different cross-sectional diameter. The devices are equally efficient in transmitting from a source surface revealed in cross section as an arc of a circle to a receiver tube, or from tube to arc. Sources and receivers having "ribbed" surfaces but essentially convex cross-sections, and sources and receivers provided in fin-like configurations, are also comprehended. Certain exemplary receiver and source shapes encompassed by the term "convex" are shown in the above-noted U.S. Pat. No. 4,002,499. The terms, "absorber", "receiver" and "trap" shall be employed synonymously to designate any suitable object or device which may be employed to receive radiant energy for direct or indirect use. The term "surface" may refer to a physical surface or a conceptual surface representing a virtual source or receiver of energy, said virtual surface being chosen to accommodate tolerance requirements, gaps between source or receiver and reflecting wall, and the like.

As employed herein a "string construction curve" shall mean and include that smooth, operatively convex curve generated with respect to convex source and receiver surfaces according to the method hereafter described with respect to FIGS. 1 through 3 and 4.

Devices of the present invention operate to transmit radiant energy emanating from a convex source at a first predetermined angle onto a convex receiver, at a second predetermined angle and in one or less reflections. The prescription for shaping and positioning of a reflective wall surface relative to the convex source and receiver to accomplish this result will be best understood through preliminary consideration of a shaping and positioning exercise under hypothetical conditions not comprehended by the present invention, i.e., conditions involving transmission from a planar source located at a finite distance from a convex receiver.

Figure 1:
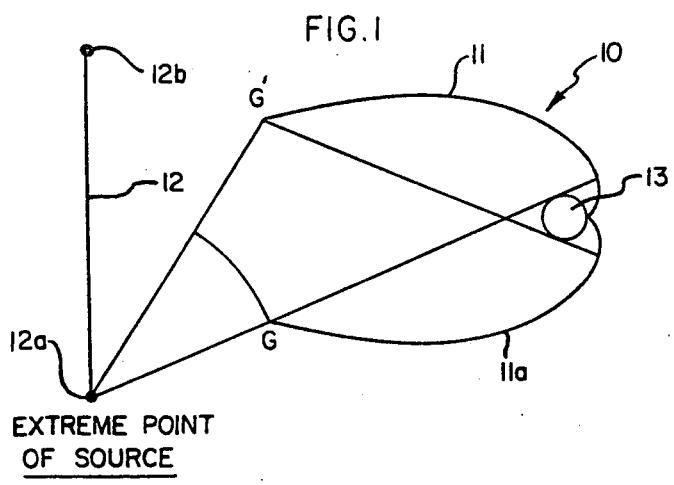
FIGS. 1 to 3 illustrates the context for determining the positioning and shaping of a reflective wall of a device of the invention according to the string construction.

FIG. 1 illustrates the two-dimensional solution for design of a concentrator 10 including reflecting wall portions 11 and 11a for reflecting energy rays emanating from the planar energy source 12 onto convex receiver 13. The string construction fixing the location and concave curvature of wall 11 is as follows (reference being made to FIGS. 2 and 3).

Figure 2:
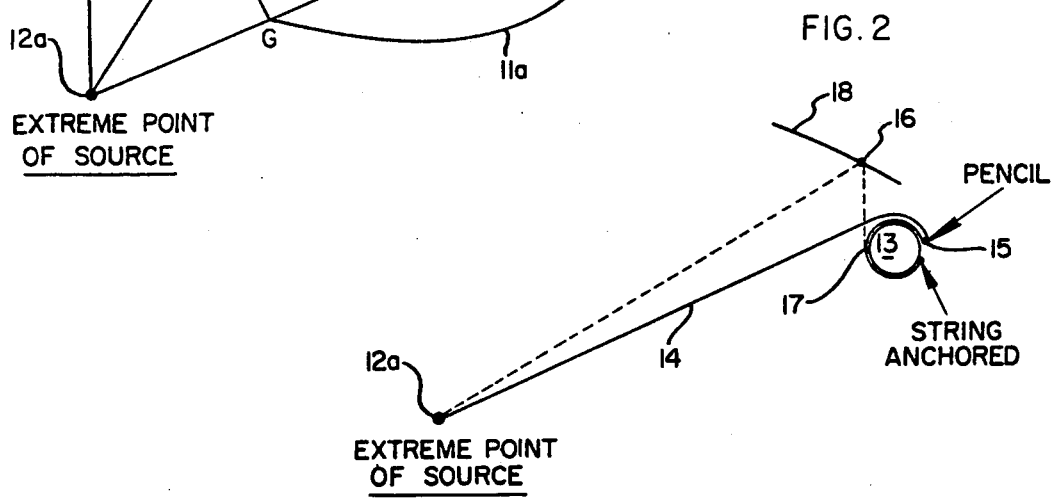
Figure 3:
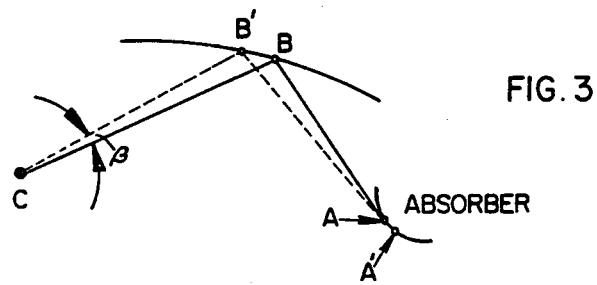

A string 14 is tied between one extreme point 12a of source 12 and a point 15 at the operative rear portion of absorber 13 and the string is pulled taut with the writing point of a pencil 16, as in the so-called gardener's method of drawing an ellipse. The length of the string is such that it will be taut when it is pulled right around the convex curving surface 17 of absorber 13 to reach point 15 as illustrated in FIG. 2. The string 14 then unwound (as shown by the dashed line), keeping the string taut. The mark of the sliding pencil point (line 18) in this two dimensional construction, together with the companion curve 11a based on rays from the opposing extreme point 12b of source 12, describes the correct profile curve allowing for all rays within points G, G' to be reflected by reflecting wall portions 11 and 11a onto receiver 13.

To verify that this curve is correct, it need only be shown that the line segment 18 so drawn is invariably at the correct angle to produce the desired reflection of a ray from point source 12a along a line tangent to the surface of receiver 13. This demonstration is provided by the illustration of FIG. 3 wherein, for convenience of geometric analysis, the extreme point of the source has been assigned the letter C, a typical position of the writing point of the pencil has been assigned the letter B and the string is shown to be tangent to the absorber at point A. If, consistent with the constraints of the string, the pencil is moved to B' where the angle, B C B', is a small angle $\beta$, the point of tangency of the "unwinding" string is moved to A'. Simple linear analysis reveals the relationship, $$CBA = CB'A' - AA' + O(\beta^2),$$

so that $$CBA = CB'A + O(\beta^2).$$

Thus, by Fermat's principle, segment BB' must be a portion of the reflecting surface that reflects a ray along CB into BA.

Figure 4:
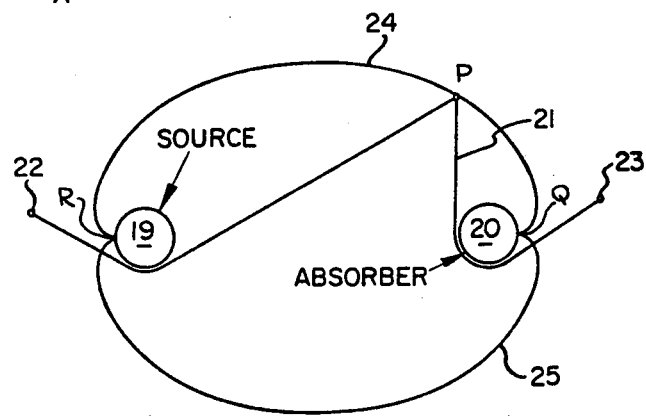
FIGS. 4 and 5 illustrate the string construction applied to a convex source and receiver according to the invention.

FIG. 4 illustrates significant two dimensional aspects of the above string construction method generalized to a device according to the invention. For ease of illustration, both source 19 and receiver 20 are shown as circular in cross-section and having equal diameters. The string 21 is anchored to two points, 22 and 23, located anywhere operatively rearward respectively of source 19 and absorber 20, and stretched with the pencil to point P. The length of string 21 is selected so that the pencil point may be moved to reach point Q when wound around the receiver. Sliding movement of the pencil within the limits imposed by the string so positioned generates the smooth curving line 24, originating at Q, passing through P and extending to the point R. During this process the string would "unwind" from around receiver 20 and "wind" around source 19. The mirror image smooth curve 25 in this construction is generated by applying the string construction method to the opposing "side" of the source 19 and receiver 20, with the string again originating at points 22 and 23 and having a length sufficient to reach "around" in the opposite direction to points Q and R.

Geometric analysis of this two dimensional construction reveals that the curves 24 and 25 invariably satisfy the condition that any ray emanating tangent to source 19 will be directed tangent to the receiver 20 after at most one reflection. All rays emanating from the source, therefore, will invariably reach the absorber after none, one, or more reflections.

Practical considerations imposed by the projected use of devices of the invention may dictate a departure from the "tangent to source/tangent to receiver" condition present in the above-noted example of generation of the string construction curve. It may be desired, for example, that reflected rays impinge upon the absorber at less than tangency. In such a case, the string construction method would still apply to determination of wall shape and location, but the string would be made to "unwind" from the receiver at some predetermined angle of less than 90°. The geometric conditions governing this modification are described more fully in U.S. Pat. No. 4,130,107. A similar minor adjustment would allow for single reflection (tangent to the receiver) of all rays emanating from a convex source at a predetermined angle of less than 90°. Put another way, it is not essential to application of the string construction method for locating and shaping a reflective wall that the selected angularity of source or angularity of absorbance be 90°.

It is also worthy of note that practical considerations may dictate some reasonable departure from the demand of the string construction method that the reflecting wall be in contact with the source and receiver (e.g., at points Q and R in FIG. 4). If, for example, there is a substantial risk of energy loss by conduction from source or receiver into wall materials, one may introduce gaps by simply terminating the string construction curve short of contact with the source or receiver. A preferred method for accommodating gaps is to unwrap the string from a virtual source or receiver. For example, the virtual source may be comprised of the minimal convex surface encompassing the actual source and the closest point of approach of the reflecting wall to the source. In either case, for small gaps, there will be an insubstantial departure from the ideal transmission characteristics in the device. Losses occasioned by this departure should, however, be offset by a minimization of energy conduction losses.

Figure 5:
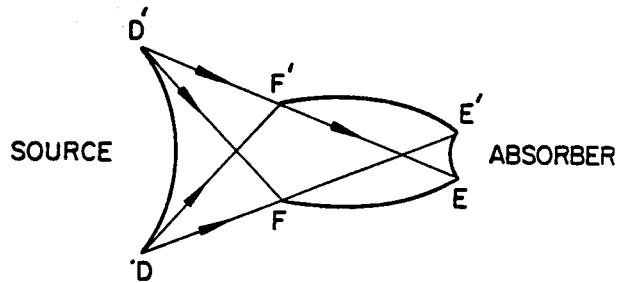

FIG. 5 provides an embodiment of a device according to the invention illustrative of the effective transmission of all radiant energy of predetermined angularity with respect to a dimensionally large convex energy source (including convex curve DD') onto a dimensionally small convex receiver (including convex curve EE'). The ideal shape for concave curving wall portions FE and F'E' is generated by application of the string construction method described above. Reversal of source and absorber functions in the FIG. 5 embodiment, with corresponding reversal of ray paths, reveals an ideal two dimensional design solution for construction of lamp/reflector device for optimally efficient, uniform illumination of a convex surface of an object with energy from a convex lamp.

Figure 6:
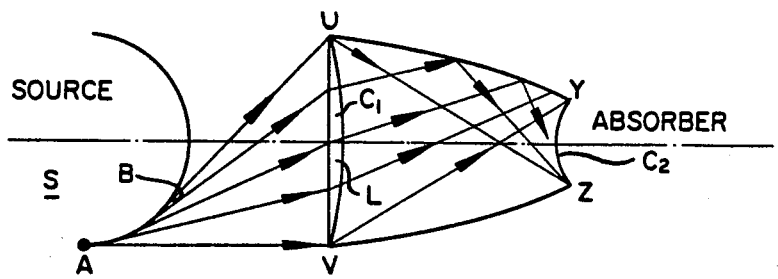
FIG. 6 illustrates a device of the invention including a lens element.

The embodiment of FIG. 6 generally corresponds to that of FIG. 5 except for the disposition of a lens within the system at a location intermediate the source and absorber. The lens here provides a classic example of nonuniformity of refractive index such as may commonly occur within an energy transmission system. The string construction method for generating the ideal location and shape of a reflecting wall which will assure transmission of source rays of selected angularity onto the receiver at a selected angularity is nonetheless applicable under these conditions upon the amendatory postulation that the string is elastic in such a way that it assumes the optical path length of the medium through which it passes. There is, of course, no way in which such a string could be physically realized, but the concept shows how ray trajectories between the extremes of the apertures always define the correct ideal shape and location of reflecting wall portions. Consistent with the above is the following, more detailed analysis of FIG. 6.

In FIG. 6 there is shown a representative convex source S from which representative selected extreme (e.g., tangential) rays are reflected onto the absorber $C_2$ by the reflective wall at a selected angle of incidence, $\theta_2$, subsequent to refraction by lens L at aperture $C_1$. For clarity, there has been illustrated a symmetric example although asymmetric configurations are also contemplated.

By the Hilbert Integral Theorem, $$\int_{C_2}^{n_2} \sin \theta_2 \, ds = <n_2 \sin \theta_2> L_{yz} \qquad (1)$$
$$= n_1 ([AB] + [BU] - [AV])$$

$$\text{Since} \int_u^z nds = \int_v^y nds \text{ by construction} \qquad (2)$$

In equation (1), $n_1$, $n_2$, refer to indices of refraction at aperture $C_1$ and absorber $C_2$. The brackets indicate optical path length. The term, $<n_2 \sin \theta_2>$, denotes the average of the bracketed quantity over the absorber $C_2$. $L_{yz}$ is the length of the curve of $C_2$ from y to z.

By the Hottel string method, $$F(C_1 \to S)L_{uv} = n_1 ([AB]+[BU]-[AV]) \qquad (3)$$

so that $$L_{uv}/L_{yz} = <n_2 \sin \theta_2>/F(C_1 \leqq S) \qquad (4)$$

where $L_{uv}$ is the length of the curve $C_1$ from u to v.

In equations (3) and (4), F denotes the radiation shape factor. Equation 4 shown that the design attains the maximum possible concentrative transmission allowed by the Second Law of Thermodynamics.

Practical utility of the present invention as well as distinctness of the inventive devices from any heretofore provided in the art is believed to be made apparent by consideration of FIGS. 7 and 8. FIG. 7 generally shows essential elements and their locations in an elliptical-cylindrical mirror cavity pump system for laser generation. Flash tube light source 26 is mounted with its axis in parallel alignment with the axis of tubular lasing rod 27. The flash tube and lasing rod are surrounded along their longitudinal dimension by continuous, operatively concave, elliptical cylindrical reflective wall 28. The shape and location of wall 28 is defined by the relative positions of source 26 and lasing rod 27 in that the two-dimensional plot for the ellipse is generated on the basis of using the axes of the tubes as the elliptical foci.

While certainly functional, such devices are far from optimally efficient. Substantial energy is lost by reflection of rays back into the source as well as by multiple reflections from the reflecting walls. Further, the distribution of energy entering the laser rod is far from uniform across its surface. Within the context of consideration of the present invention, it is clear that the defects of these devices stem from the fact that elliptical shaping of the mirror wall (with tube axes as foci) simply fails to take into account that these geometrically convex objects are not in fact "points". Put another way, the elliptical mirror shape would be theoretically optimum if one were dealing with a point source and point receiver. The existence of any dimensional characteristics for the source and receiver immediately diminishes the wall's capacity for optimal efficiency in reflection, especially for rays of extreme angularity off the energy source, due to severe aberrations of the elliptical mirror for non-point-like sources and receivers.

FIG. 8, on the other hand, reveals the theoretically most efficient configuration for a mirror cavity pump. Longitudinally-extending flash tube 29 is again mounted in parallel alignment with lasing rod 30. Wall 31, however is non-elliptical and assumes, instead, the position and concave shape dictated by the string construction applied to the real dimensions of the source and receiver and incorporating the "tangent to source/tangent to receiver" condition illustrated in FIG. 4 so as to completely enclose the volume of space surrounding the convex source and receiver. The shaping and positioning of reflective wall 31 is immediately revealed to provide for the highest theoretical efficiency of transmission of flash tube energy onto the lasing rod with the optimal theoretical uniformity of energy distribution over the lasing rod surface. Each ray emanated tangent to flash tube 29 will invariably reach lasing rod 30 in one or less reflections from a portion of reflective wall 31 and the only potential energy loss is that resulting from absorbance by the reflecting wall itself.

As noted earlier, practical considerations may dictate that "working" designs for laser generating devices include avoidance of physical contact between flash tube 29 or lasing rod 30 and wall 31 at the contact points 32 and 33 as dictated by the strict application of the string construction method. As further noted above, it may be desirable to immerse both the source and receiver in an energy transmitting refractive medium. Proper selection of the medium on the basis of refractive index relative to air or other surrounding medium and proper adjustment of the string construction method to account for the refractive index of the immersing medium allows construction of a device wherein reflectivity at the interface of the immersing and surrounding media is provided according to principles of total internal reflectivity i.e. the surrounding media or volume being of lesser refractive index than the internal or immersing media or volume.

Numerous modifications and variations in the construction of devices according to the above description of the invention are expected to occur to those skilled in the art. Consequently only such limitations should be placed on the scope of the invention as appear in the appended claims.

What is claimed is:

1. In a device for transmission of radiant energy from a longitudinally-extending source having a convex surface to a longitudinally-extending receiver having a convex surface wherein a longitudinally-extending wall portion positioned adjacent either said source, or said receiver, or both said source and receiver, provides a means for reflecting radiant energy emanating from said source onto said receiver, the improvement comprising a non-imaging concentrator which includes a concave reflective wall portion which is non-elliptical in two dimensional cross-section and shaped and positioned with respect to said receiver and source so that energy rays emanating from said source along its length at a first predetermined angle and impinging upon said reflective wall portion are made to be incident upon said receiver at a second predetermined angle, in a single reflection from said wall portion.

2. The device of claim 1 wherein said first predetermined angle is tangent to said source and said second predetermined angle is tangent to said receiver.

3. The device of claim 1 wherein said longitudinally-extending source and receiver are circular in cross-section and aligned on parallel axis.

4. The device of claim 1 wherein said longitudinally-extending source and receiver are circular in cross-section and aligned on parallel axis, and said wall portion encloses the volume of space surrounding both said source and receiver, the shape and position of said wall portion with respect to said source and receiver being such that extreme energy rays emanating from said source along its length will be transmitted to and impinge upon said receiver directly or in one reflection from said wall portion.

5. The device of claim 4 wherein said source is a pump lamp for a lasing rod and said receiver is said lasing rod.

6. The device of claim 4 wherein said volume is filled with a medium having a selected index of refraction.

7. The device of claim 6 wherein said reflective wall portion comprises the interface between said medium filling said volume and having a given index of refraction and a second medium of lesser refractive index in optical contact with said medium filling said volume.

* * * * *